June 21, 1938.  R. R. RIDGWAY ET AL  2,121,744

ELECTRIC FURNACE

Original Filed Oct. 20, 1933

Inventors
RAYMOND R. RIDGWAY
BRUCE L. BAILEY

WITNESS
Franklin E. Johnson

By Clayton L. Jenks
Attorney

Patented June 21, 1938

2,121,744

UNITED STATES PATENT OFFICE 2,121,744

ELECTRIC FURNACE

Raymond R. Ridgway and Bruce L. Bailey, Niagara Falls, N. Y., assignors to Norton Company, Worcester, Mass., a corporation of Massachusetts Original application October 20, 1933, Serial No. 694,502. Divided and this application September 30, 1935, Serial No. 42,838

5 Claims. (Cl. 13—23)

This invention relates to an electric furnace, and the present case is a division of application No. 694,502, filed Oct. 20, 1933, now Patent No. 2,027,786, of January 14, 1936.

Boron carbide of the formula $B_4C$, as described in the U. S. patent to Ridgway No. 1,897,214, is harder than the standard cutting tools, as well as crystalline alumina and silicon carbide, and it is only slightly below the diamond on the scale of hardness; hence, it is extremely difficult and expensive to shape an article of boron carbide by the ordinary cutting and grinding methods. It is, therefore, desirable to shape the article by a casting or molding process. Although the material melts readily without loss by volatilization and can be shaped in a refractory, non-reactive container; yet owing to its high melting point, the materials suitable for use as a mold are limited in number; and for practical considerations, graphite is the only inexpensive mold material which is available for commercial use. However, boron carbide cannot be shaped by the ordinary procedure of melting the material in a graphite mold without its dissolving a substantial amount of graphite, at least in its surface portion, which will appear as parting planes of graphite between the boron carbide crystals and so render the product useless for many industrial purposes. Other high melting materials, such as crystalline alumina and zirconia, present similar problems in a molding operation or when heated for other purposes to a high temperature.

The primary object of this invention is to provide an electric furnace structure which is adapted for molding an article of boron carbide or other suitable material to accurate dimensions and required physical characteristics, while preventing detrimental chemical reactions.

A further object is to provide an electric furnace of general utility for heating various types of material contained therein. Other objects will be readily apparent in the following disclosure.

In accordance with this invention, a shaped article of boron carbide may be made by heating boron carbide of a required degree of purity, and particularly the material described in the Ridgway Patent No. 1,897,214, to a temperature at which it will melt or soften and shaping the material directly in a mold under a suitable pressure, while maintaining conditions which prevent the material from reacting chemically with or physically dissolving foreign substances capable of detrimentally affecting the properties of the shaped article. This operation is preferably carried on in the presence of an inert atmosphere or in the absence of oxygen or other materials which cause reactions or decomposition of the boron carbide. Of the available refractory materials for the mold, graphite of the purest and highest quality is preferably chosen. Owing to the ease with which molten boron carbide dissolves graphite, a special feature of this invention involves a furnace structure which is suitable for heating the material to a softened condition and causing it to be shaped while it is too viscous, or insufficiently heated, to dissolve or react with the graphite mold parts to any detrimental extent. Even if the material is fully melted, it is rapidly cooled after it has assumed its final shape, to a temperature at which the product is stable. In this way, the material is not permitted to remain in contact with graphite while in a molten state, or only for the minimum of time required for the casting operation.

In order to mold a boron carbide article of a required size, boron carbide of required composition and purity is powdered to a finely divided condition and a predetermined amount of the powder is subjected to a definite pressure while it is being heated in a graphite mold arranged within an electric resistance furnace of suitable characteristics and dimensions as described herein. The temperature and pressure are so regulated that as soon as the material has reached a softening point, which is considered to be below the melting point, or one of complete fluidity, the pressure is sufficient to consolidate the granules into an integral body of the required density and other physical characteristics. When this has been attained, the electric power is immediately shut off, but the pressure may be released or allowed to remain applied to the material as desired. It is desirable not to hold the material near its melting point, while in contact with graphite, for any longer time than necessary to effect the molding operation; and this is accomplished by cooling the body quickly through to a substantial range below the melting point, as by applying cooling water to the furnace as soon as the body has been shaped and the current cut off. The cooling operation may be so controlled as to cause any desired annealing of the body and crystal formation. For some uses, the material may be melted or heat softened in a suitable furnace, and then cast in a separate mold, as required for die casting and other molding operations, but in all cases it is desirable to keep the boron carbide in a non-oxidizing atmosphere, since the heated material reacts violently with oxides and oxygen.

Experimental evidence indicates that liquefaction or softening of the boron carbide in granular condition begins at a temperature considerably below its melting point when it is subjected to a high pressure. It has been assumed, but not proved, that the applied pressure brings about localized points of slightly higher pressure density on the points and edges of the softened grains, which causes them to deform gradually into a viscous mass and until the pores have been substantially eliminated and the maximum apparent density has been attained, with the material of the particles cohering as an integral body. If coarse grains are used with the resulting large, intergranular spaces, a much larger pressure is required to produce the maximum density than when fine sizes are used. Hence, for attaining the maximum density, a particle size smaller than will be retained on a screen of 200 meshes to the linear inch is preferably used. A fixed sizing of the grains is preferable so that a definite volume-weight relationship may be had in the shaped article. If such a powder of substantially pure boron carbide is employed, the apparent density may be raised to a value substantially equal to or within 2% of the real density of boron carbide, which is about 2.52. Many satisfactory articles ranging in size from ¼ to 1½ inches in diameter have been made of a density between 2.3 and 2.52 by the application of pressures between 100 and 5000 pounds per square inch and without heating the boron carbide sufficiently to cause it to dissolve graphite to any material extent. Less dense articles may be made by suitably controlling the temperature and pressure, as will be understood.

As above indicated, it is desirable to maintain the temperature of the material below its melting point during the casting operation, or to prevent the material from remaining in a molten condition for any greater length of time than necessary to permit shaping the article. To measure and control these high temperatures, various types of apparatus may be employed. We prefer to observe the temperature by means of an optical pyrometer suitably located in the furnace, and to control the electric current and the pressure by manually operable devices to effect the desired results. We have observed that the final temperature is directly related to the pressure, and that upon releasing the pressure, the softened material will again solidify. Consequently, the molding temperature may be varied by making corresponding changes in the pressure conditions, and articles of required densities may be produced without allowing the temperature to approach too closely the point at which graphite is dissolved materially. It is also feasible, when the material is molded by the pressure of a movable plunger, to employ the motion of the plunger itself for determining when the molding operation has been completed and when the maximum temperature required has been obtained. For example, when the plunger movement indicates that the material has been compacted to the required density, the temperature may be immediately lowered to a point at which the boron carbide may safely lie in contact with the graphite mold without dissolving any of the carbon and to effect the required crystallization and solidification of the boron carbide.

One form of apparatus which is adapted for making such articles is illustrated in the accompanying drawing, in which.

The construction employed for making boron carbide articles preferably comprises a resistance furnace having a resistor of suitable material and electrical characteristics for obtaining the required temperature. This resistor is a hollow tube, and the refractory mold parts required for shaping the boron carbide articles are inserted within the central heated space of the tube so as to be subjected to the maximum heat within the furnace. One or more plungers of refractory material likewise extend within the hollow resistor and serve for consolidating the boron carbide granules.

Figure 1:
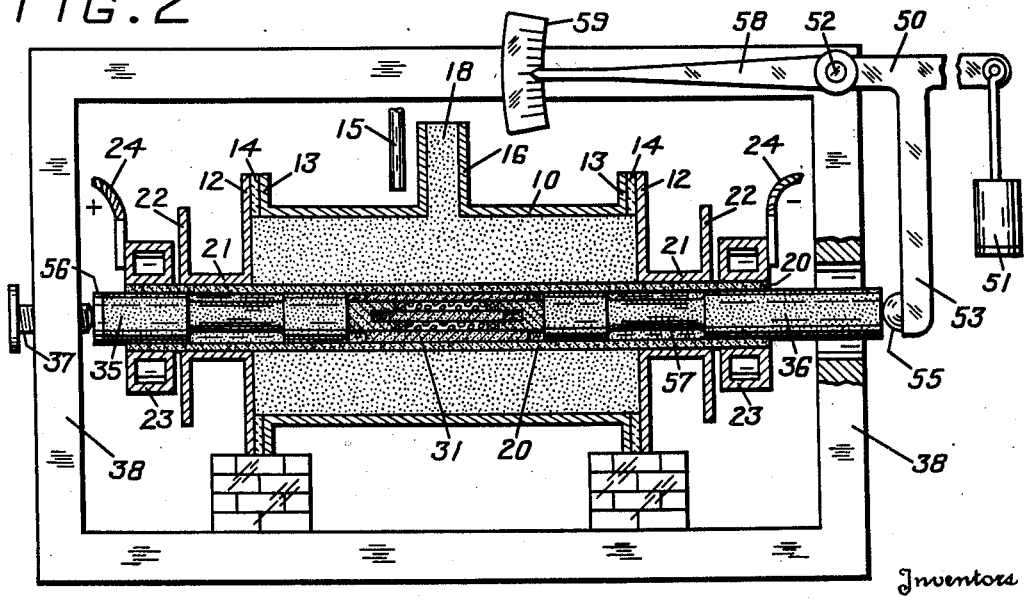
Fig. 1 is a vertical section, with parts broken away, of an electric furnace and mold arranged for forming a hollow, cylindrical or tubular body of boron carbide.

In the embodiment illustrated in Fig. 1, the furnace comprises a cylindrical iron shell 10 of suitable dimensions which with metal end walls 12 forms a heat-insulating and protective casing for the graphite resistor and mold parts. The cylindrical shell has end flanges 13 which are bolted or otherwise secured to the walls 12, but the shell is insulated from the end walls by suitable insulating rings 14 therebetween. A stream of water may be applied through the tube 15 or other suitable device for cooling the shell of the furnace and the ends of the resistor. A pipe 16 fastened to the upper portion of the shell 10 serves for the introduction of insulating material and the exit of gases generated or expanding therein. An optical pyrometer may be suitably located within this pipe, or it may be otherwise incorporated in the apparatus.

In order to form a proper support for a graphite resistor tube 20, the end plates 12 are each made integral with a cylindrical sleeve 21, which in turn is fastened to an upright flange 22 forming spool-like ends. The sleeves 21 serve as bearing supports for the graphite resistor 20, while the flanges 22, together with the flanges 13, prevent water from contacting with the electric terminals. The graphite resistor 20 projects outwardly beyond the sleeve 21 and has fastened at its opposite ends the water-cooled terminals 23 to which are connected the lead-in cables 24 for supplying electric current thereto. Except as herein described, the various parts of this furnace may be made in accordance with standard construction, as is well known in the art. It will, for example, be appreciated that the dimensions of the resistor rod 20 will be determined in accordance with the temperature requirements of the furnace. For instance, a load of 12 kilowatts is required in a small furnace for making a boron carbide article of the sizes herein specified.

The hollow graphite resistor rod 20 is surrounded by a mass of pulverulent lamp black or other suitable material, which is fed into the furnace as required through the tube 16. This material being of the same chemical nature as the graphite resistor 20 serves to surround the resistor rod with an inert environment and to prevent the tube 20 from being oxidized. Any air entrapped therein will be converted to non-oxidizing gases.

Figure 3:
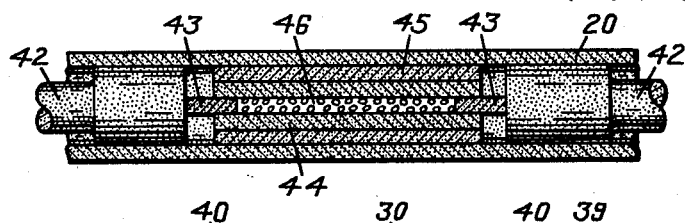
Fig. 3 is a detail similar to Fig. 2, showing the arrangement of the mold parts for producing a solid body of cylindrical or other shape.
Figure 2:
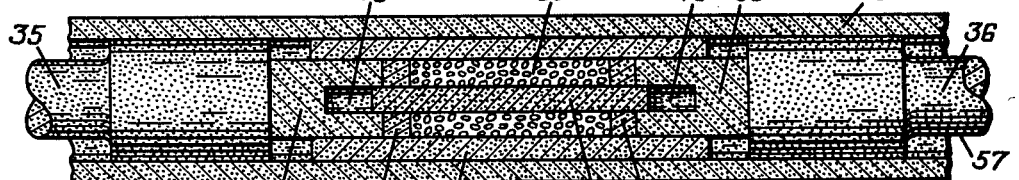
Fig. 2 is an enlarged detail partly in section, of the graphite mold parts shown in Fig. 1.

This invention contemplates placing a definite, weighed amount of boron carbide powder of required granular size in a mold of predetermined dimensions and compressing the same until it has assumed the required density. While various mold constructions may be employed within the scope of this invention and as are required for shaping the different types of articles, the forms shown in Figs. 2 and 3 are typical of mold constructions which are serviceable in this type of furnace. As there shown, the resistor 20 has a cylindrical inner surface of accurate dimensions, and it is so arranged that the mold parts may be slidably mounted therein. The resistor and the mold parts are preferably made of the best available graphite material, of the so-called "extra quality", which is strong and has been processed to a maximum density, such as is used for electric furnace electrodes. This material is substantially pure carbon, with only negligible amounts of ash constituents. It is capable of being machined to accurate dimensions.

The mold shown in Fig. 2, and on a smaller scale in Fig. 1, is serviceable for making a hollow, cylindrical article from a mass of boron carbide powder 30. This mold comprises a cylindrical sleeve 31 and a cylindrical core 32 of graphite, together with ring-shaped end walls 33 which are slidably mounted within the sleeve 31. The mold space formed by the sleeve 31, the core 32 and the rings 33 serves to contain the boron carbide granules 30 and defines the shape of the compacted article. The rings 33 fit loosely within the sleeve 31 and accurately and tightly around the highly polished core 32 and serve as a compression packing which lessens the strain on the central core. They also prevent the boron carbide in its softened condition from escaping from the mold chamber. In order to apply pressure to the boron carbide granules as they are being heated, one or more plungers, which are likewise made of refractory material, and preferably graphite, are fitted for sliding movement within the resistor 20. Two plungers 35 and 36 are illustrated, one of which may be stationary and the other movable or both may be movable. Improved results are obtained by pressing the powder from both ends. The left-hand plunger 35 is shown in Fig. 1 as mounted merely for adjustable movement within the resistor 20, which is accomplished by the screw 37 in the framework 38. This adjustment serves to locate the boron carbide material within the hottest zone of the furnace, as determined by the size of the article to be formed.

In order that the movement of the plungers may be properly transmitted to the boron carbide granules 30 in the mold space, it is preferable to employ intermediate plunger blocks 39, each of which is engaged by the inner ends of one of the plungers and is provided with a recess 40 which fits loosely over the ends of the core 32 projecting through the disk 33 and thus slides thereon. These blocks fit accurately and tightly within the sleeve 31, hence cooperate with the rings 33 to confine the boron carbide within the mold space. Consequently, pressure applied to the plungers 35 and 36, as indicated in Fig. 1, will cause the blocks 39 to force the rings 33 towards each other and thus compact the boron carbide granules therebetween. These members 33 and 39 are herein considered as associated parts of the plungers.

If a solid body is to be made, then the construction shown in Fig. 3 may be employed, which is generally similar to that of Fig. 2. In this case, the resistor 20 has fitted therein the slidable plunger members 42, and these engage the blocks 43 of suitable shape, which fit accurately within the ends of the sleeve 44 and thus form a mold chamber. Surrounding the sleeve 44 is a further sleeve 45 which in turn is removably mounted within the resistor rod 20. It will be appreciated that these parts are so made as to permit removability of the shaped boron carbide article, as well as replacement of the mold parts at the minimum of expense. With this arrangement of parts, the plungers 42 will move the plunger blocks 43 inwardly and apply end pressure to the boron carbide particles and compress them within the mold chamber 46.

The application of a measured pressure and the indication of the movement of the plungers is effected, as shown in Fig. 1, by means of a lever arm 50 carrying a suitable weight 51. The lever is fulcrumed on a pin 52 mounted on the framework 38 and has an arm 53 which in turn applies pressure to the right-hand plunger 36 through an intermediate insulating member 55 resting against the end of the graphite plunger. A further insulating block 56 may be placed between the plunger 35 and the screw 37. It will be observed that the plunger 36 has a considerable sliding contact with the inner surface of the resistor 20, but it may be reduced in cross-section, as at 57, in order to cut down the sliding resistance. In order to observe the movement of the plunger, a pointer 58 forms an extension of the lever arm 50 and rides over a sutiably graduated scale 59 mounted on the frame. The parts are so arranged that the furnace operator may watch the movement of the scale pointer 58 and stop the electric current flow when the pointer indicates the proper temperature and pressure conditions.

In the operation of this furnace and the manufacture of a molded boron carbide article, the exact conditions will be determined by the nature of the material used and the size and density of the finished product. In the manufacture of a small article, such as is employed in a sand blast nozzle or a wire drawing die, which is of comparatively small dimensions but is required to be of the maximum obtainable density and to be accurately dimensioned, it is preferable to make the article in accordance with the following procedure. Boron carbide of a high degree of purity, and preferably that type of material which is obtained in accordance with the process set forth in the Ridgway Patent No. 1,897,214 and treated with acid as above described, is crushed to a suitable size, and preferably one which is finer than will be retained by a screen of 200 meshes to the linear inch. The material may comprise a mixture of coarse and fine sizes so as to give the maximum apparent density to avoid large plunger movements. A definite weighed amount of this material, as predetermined by suitable calculations, is placed in the mold cavity (Fig. 2) formed by the sleeve 31, one of the rings 33 and the core 32, after which the other ring 33 is assembled on the core and the parts are slidably mounted within the resistor 20. Then, the plunger rods 35 and 36 and the blocks 39 are properly assembled in place. The material may be preliminarily pressed to shape in the mold or prior to its being placed in the mold, so that it will have an apparent density of about 2.0, thus lessening the plunger movement and otherwise improving the casting operation. Upon the application of electric current of suitable voltage and amperage, the resistor rod 20 and associated parts will be rapidly heated to the required temperature. If desired, the plunger movement may be so controlled that a definite amount or weight of grains, which has been calculated to occupy a desired volume percentage of the final product, will be caused to occupy that volume in the shaped body, so that the porosity will likewise constitute a desired volume. The plunger may be restrained in its movement by any suitable device arranged for the purpose.

The pressure to be applied by the weight 51 will be determined in accordance with the size and desired density of the article to be made. For example, in making a sand blasting nozzle, the pressure limits may be maintained within a range of from 1000 lbs. to 5000 lbs. per sq. in. to produce articles of the highest quality. For a tube $2\frac{1}{8}$ inches long, with an outside diameter of $\frac{7}{8}$ inch and a core diameter of $\frac{5}{16}$ inch, a pressure of 3000 lbs. per sq. in. has been found to be satisfactory and will form a completed article with a density greater than 2.4 when the maximum temperature reached in the formation of this piece was approximately 2350° C.

Figure 4:
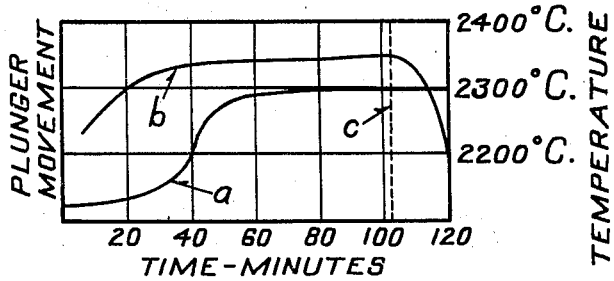
Fig. 4 shows curves which indicate the relationship of the plunger movement to the temperature of the boron carbide.

As above stated, the movement of the plunger may be employed to indicate the condition of the boron carbide while it is being compacted and as a temperature measurement. This is illustrated in Fig. 4 which shows two curves, the lower curve "$a$" representing the movement of the plunger in a definite time interval while the other curve "$b$" represents the approximate temperature attained by the boron carbide during a particular casting operation. As shown by the curves, it will be observed that the plunger moves inwardly very slowly at first and until the temperature has nearly reached a maximum, after which it moves rapidly to compact the material. Thereafter, the plunger moves but slowly while the temperature increases slightly or remains substantially stationary. If it is desired to obtain a maximum density of the article, then the heating may be kept up until the plunger has become substantially stationary, as indicated by the dotted line "$c$". Then, the heating current may be cut off. At this point of maximum density "$c$", the temperature, as measured by optical instruments, reached the point of approximately 2300° C., or possibly the melting point of the boron carbide. It will now be appreciated that to effect a very delicate control of the temperature and pressure compacting of the boron carbide article, one watches the movement of the plunger or the pointer 58 and when the plunger movement is slowing up or has practically stopped, he may cut off the current and cool the furnace rapidly by the water stream, and so not permit the boron carbide to be further heated and approach more closely to its melting point or to remain molten for any considerable length of time. Whether or not these curves indicate that the boron carbide has become entirely transformed to the liquid phase cannot be stated. It, however, is to be observed that the temperature curve has a slight upward slope, thus indicating that the material has not yet reached a molten condition. However, one may so control the length of the heat softening and compacting period as to keep the boron carbide from contacting with the graphite mold any longer than necessary while it is in a molten condition; and, if desired, the pressure casting operation may be stopped at a point short of that at which the material has become fully molten, as determined by the movement of the plunger. This affords a delicate control of the process. The degree of pressure applied as well as the grit size used will determined the density of the article. The pressure limits will, of course, be governed largely by the strength of the mold and furnace materials.

The body thus formed has a purity in excess of 99% of $B_4C$, and it is believed to be made up of a substantially continuous phase of boron carbide, which is substantially free from any cementing material of a low degree of hardness. The body has a conchoidal crystalline fracture and freedom from any material amount of graphite and other undesired impurities, and it appears to be similar to the boron carbide material as originally made in the electric furnace in accordance with said Ridgway patent. If a density of 2.3 or greater has been attained, the body is of metal-like appearance capable of taking a high polish, and its modulus of rupture in compression is in excess of 100,000 lbs. per sq. in. If it is desired to manufacture a porous or spongy article, then a coarser granular material may be used, and the pressure and temperature conditions will be so controlled as to cause these larger granules to knit together at their points of contact, but to leave a desired pore volume therebetween.

It will now be appreciated that the furnace structure which will serve for molding boron carbide is also applicable for molding many other materials, such as crystalline alumina, zirconia and mullite which are capable of being softened to a plastic condition at a temperature slightly below their melting points. This furnace construction insures that they may be molded under high pressure at a temperature at which the mass may be compacted to the desired shape and yet reaction with the carbide container will be substantially prevented. It is also to be appreciated that the furnace structure is capable of use for heating various materials whether or not they are to be compressed by movable plungers. It is particularly effective as a heating furnace of general utility, since the heat resistant graphite sleeve is removable and thus may be readily replaced when injured in any way or consumed to a serious extent by detrimental reactions within the furnace or if it is required that the molded material be removed while still held within the container formed by this sleeve, with or without the compression members which close the ends of the sleeve. The end walls within the sleeve serve to form a fully enclosed space for the material to be heated and thus to confine the heat within the heating chamber. Various uses will be readily apparent for this furnace structure, and the invention is not to be considered as limited to the manufacture of boron carbide articles or of articles shaped under pressure, except as is defined in the appended claims.

We claim:

1. An electric furnace comprising a casing, a graphite resistor tube extending longitudinally within the casing and opening to the outside thereof, a graphite sleeve removably and slidably fitted within the central portion of said tube and supported throughout its length thereby, said sleeve being in both heat and electrically conductive relationship with the tube and arranged to be charged in situ with the substance to be heated, means including electric terminals and removable closures for the ends of the tube which form a circuit of high conductivity that localizes the electrically developed heat to the central portion of the resistor, heat insulation between the resistor and the casing and means for cooling the casing.

2. An electric furnace comprising a metallic furnace casing having peripheral and end walls, insulation between the peripheral wall and an end wall, a horizontal graphite resistor tube extending longitudinally therethrough and having its ends supported by but projecting beyond the end walls, electric terminals connected with the projecting ends of said resistor tube, an open ended graphite sleeve arranged to be charged in situ with the material to be heated which is removably and slidably fitted within the resistor tube and is in both heat and electrically conductive relationship thereto, closures for the ends of the resistor tube which form a heat retaining chamber therein but permit removal of the sleeve, material filling the space between the resistor tube and the casing and serving as both electrical and heat insulation and means for cooling the peripheral and end walls of the casing.

3. An electric furnace molding apparatus comprising an outer casing, a hollow resistor tube extending longitudinally therethrough, electric terminals connected to the ends of said tube, a liner sleeve removably and slidably fitted within the resistor tube and adapted to be charged in situ with the material to be molded therein, said sleeve and resistor tube being in heat and electrically conductive relationship, and means including a plunger within the tube which is slidably fitted within the sleeve for compressing material located therein when the resistor is heated.

4. An electric furnace molding apparatus comprising an outer casing, a hollow graphite resistor tube extending longitudinally through the casing, electric terminals connected to the ends of said tube, a hollow graphite sleeve removably and slidably fitted within the resistor tube and adapted to contain material to be molded therein, said sleeve and resistor tube being in both heat and electrically conductive relationship, two graphite plungers within the tube which are slidably fitted in the opposite ends of the sleeve and adapted to compress material therebetween, means for moving the plungers relatively towards each other when the resistor has been heated in order to consolidate the material within the sleeve mold and means for water cooling the casing.

5. An electric furnace molding apparatus comprising a metal casing having peripheral and end walls, insulation between the peripheral wall and an end wall, a graphite resistor tube extending horizontally within the casing and projecting through and supported by the end walls, heat insulation between the casing and the resistor, water cooled electric terminals connected to the ends of the resistor, a graphite sleeve removably and slidably fitted within and fully supported by the resistor in electrical contact therewith and forming the peripheral wall of a mold chamber, two graphite plungers slidably fitting within the sleeve and associated therewith to form a mold and compress material therein, the sleeve and plungers being readily removable from the resistor tube without affecting the latter, means for moving the plungers relatively towards each other to compress the material, means indicating the plunger movement and means for cooling the casing wall.

RAYMOND R. RIDGWAY.
BRUCE L. BAILEY.